US012081897B2

(12) United States Patent
Shaburov et al.

(10) Patent No.: US 12,081,897 B2
(45) Date of Patent: *Sep. 3, 2024

(54) PERSONALIZED VIDEOS FEATURING MULTIPLE PERSONS

(71) Applicant: Snap Inc., Santa Monica, CA (US)

(72) Inventors: Victor Shaburov, Ocean Village (GI); Alexander Mashrabov, Los Angeles, CA (US); Grigoriy Tkachenko, London (GB); Ivan Semenov, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,567

(22) Filed: Nov. 2, 2022

(65) Prior Publication Data

US 2023/0049489 A1 Feb. 16, 2023

Related U.S. Application Data

(63) Continuation of application No. 17/348,782, filed on Jun. 16, 2021, now Pat. No. 11,558,561, which is a
(Continued)

(51) Int. Cl.
*H04N 5/265* (2006.01)
*G06T 7/194* (2017.01)
(Continued)

(52) U.S. Cl.
CPC ............. *H04N 5/265* (2013.01); *G06T 7/194* (2017.01); *G06T 7/40* (2013.01); *G06V 40/172* (2022.01);
(Continued)

(58) Field of Classification Search
None
See application file for complete search history.

(56) References Cited

U.S. PATENT DOCUMENTS 7,734,070 B1 * 6/2010 Sharma ................ G11B 27/036
382/118
10,402,689 B1 * 9/2019 Bogdanovych ... G06F 18/24765
(Continued)

FOREIGN PATENT DOCUMENTS

WO WO-2018102880 A1 * 6/2018

*Primary Examiner* — Heather R Jones
(74) *Attorney, Agent, or Firm* — Georgiy L. Khayet

(57) ABSTRACT

Provided are systems and methods for providing personalized videos featuring multiple persons. An example method includes enabling a communication chat between a user of a computing device and at least one further user of at least one further computing device, receiving a user selection of a video from one or more personalized videos, receiving an image of a source face and a further image of a further source face, modifying the image of the source face to generate an image of a modified source face, modifying the further image of the further source face to generate an image of a modified further source face, replacing, in the video, a target face with the image of the modified source face and at least one further target face with the modified further source face to generate a personalized video, and sending the personalized video to the at least one further user.

20 Claims, 11 Drawing Sheets

Related U.S. Application Data continuation of application No. 16/594,690, filed on Oct. 7, 2019, now Pat. No. 11,089,238, which is a continuation-in-part of application No. 16/251,436, filed on Jan. 18, 2019, now Pat. No. 10,789,453.

(51) Int. Cl.
- G06T 7/40 (2017.01)
- G06V 40/16 (2022.01)
- G11B 27/02 (2006.01)
- H04L 51/10 (2022.01)

(52) U.S. Cl.
CPC ............ G06V 40/174 (2022.01); G11B 27/02 (2013.01); H04L 51/10 (2013.01); *G06T 2200/24* (2013.01); *G06T 2207/10016* (2013.01); *G06T 2207/20221* (2013.01); *G06T 2207/30201* (2013.01)

(56) References Cited

U.S. PATENT DOCUMENTS

| | | | |
|---|---|---|---|
| 2003/0051255 A1* | 3/2003 | Bulman | G06Q 40/12 725/135 |
| 2006/0195786 A1* | 8/2006 | Stoen | H04L 51/04 715/700 |
| 2007/0136745 A1* | 6/2007 | Garbow | H04N 7/17318 348/E7.071 |
| 2007/0230794 A1* | 10/2007 | McAlpine | G06T 11/60 382/190 |
| 2014/0024450 A1* | 1/2014 | Ramachandran | A63F 13/79 463/31 |
| 2014/0112534 A1* | 4/2014 | Sako | G06V 40/16 382/103 |
| 2018/0184171 A1* | 6/2018 | Danker | H04N 5/272 |

* cited by examiner

PERSONALIZED VIDEOS FEATURING MULTIPLE PERSONS

CROSS-REFERENCE TO RELATED APPLICATION

This application is a Continuation of and claims the priority benefit of U.S. patent application Ser. No. 17/348,782, entitled "Personalized Videos Featuring Multiple Persons," filed on Jun. 16, 2021, which in turn is a Continuation of and claims the priority benefit of U.S. patent application Ser. No. 16/594,690, entitled "Personalized Videos Featuring Multiple Persons," filed on Oct. 7, 2019, which in turn is a Continuation-in-part of U.S. patent application Ser. No. 16/251,436, entitled "Systems and Methods for Face Reenactment," filed on Jan. 18, 2019. The aforementioned applications are incorporated herein by reference in their entirety for all purposes.

TECHNICAL FIELD

This disclosure generally relates to digital image processing. More particularly, this disclosure relates to methods and systems for providing personalized videos featuring multiple persons.

BACKGROUND

Sharing media, such as stickers and emojis, has become a standard option in messaging applications (also referred herein to as messengers). Currently, some of the messengers provide users with an option for generating and sending images and short videos to other users via a communication chat. Certain existing messengers allow users to modify the short videos prior to transmission. However, the modifications of the short videos provided by the existing messengers are limited to visualization effects, filters, and texts. The users of the current messengers cannot complex editing, such as, for example, replacing one face with another face in the video. Such sophisticated editing of the videos is not provided by current messengers and requires usage and knowledge of sophisticated third-party video editing software.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
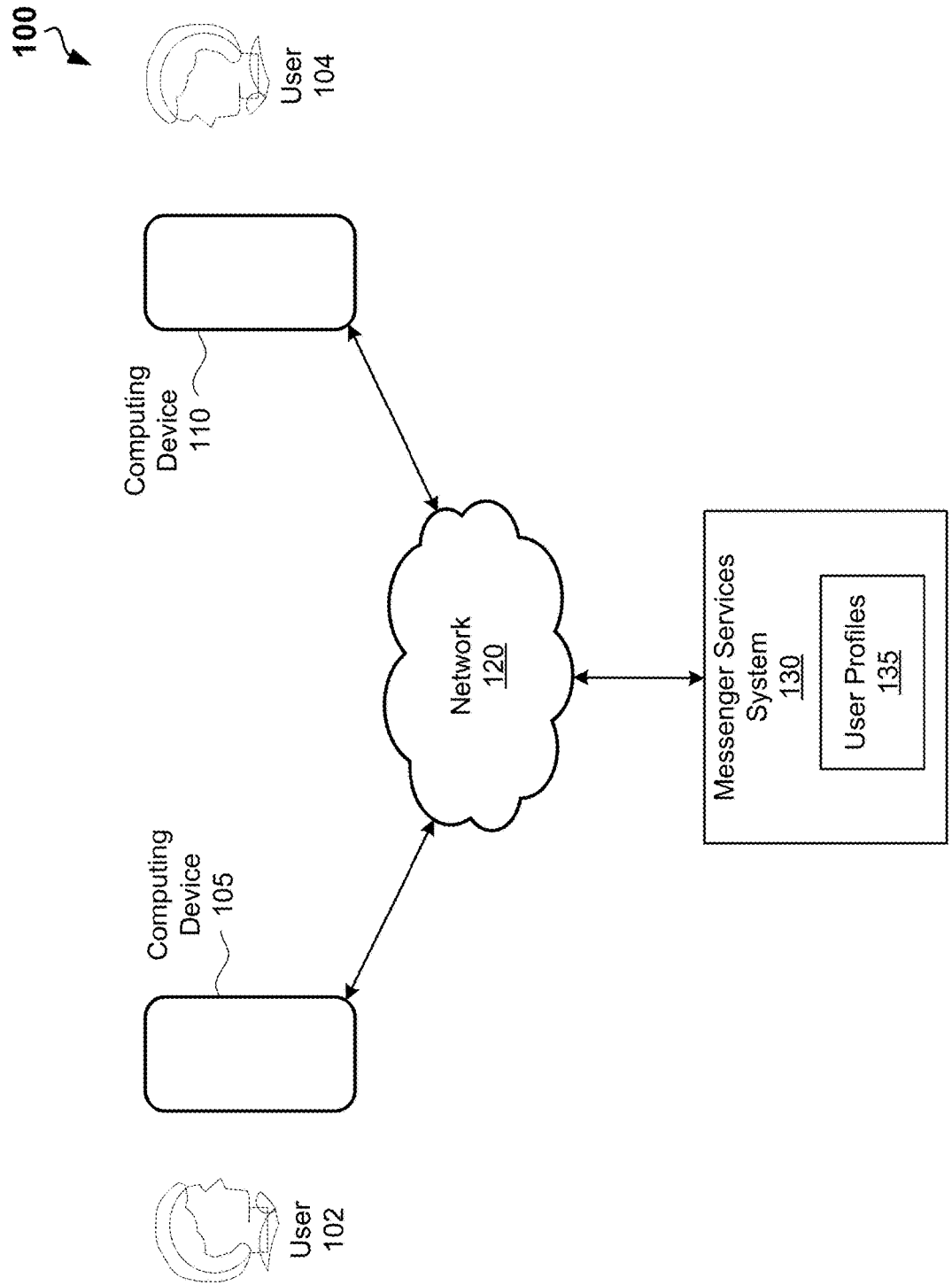
FIG. 1 is a block diagram showing an example environment wherein a method for providing personalized videos featuring multiple persons can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for providing personalized videos featuring multiple persons. The embodiments provided in this disclosure solve at least some issues of known art. The present disclosure can be designed to work on mobile devices, such as smartphones, tablet computers, or mobile phones, in real-time, although the embodiments can be extended to approaches involving a web service or a cloud-based resource. Methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium.

Some embodiments of the disclosure may allow generating personalized videos featuring multiple persons in a real time on a computing device, such as a smartphone. The personalized videos can be generated in a communication chat between a user of the computing device and one or more further users of one or more further computing devices. The personalized videos can be generated based on pre-generated videos, for example, videos featuring one or more actors. Certain embodiments of the present disclosure may allow replacing the faces of the actors in the pre-generated videos with the faces of the users that communicate via communication chats. The faces can be selected by the user from images of faces of friends in the communication chat. While replacing the faces of the actors with the faces of the users, the faces of the users can be modified to adopt facial expression of the actors. The personalized videos can be further sent by the user via the communication chat to further users. The personalized videos can be indexed and searchable based on an image of the face of the user or the faces other users utilized to generate the personalized videos. The personalized videos can be ranked and categorized based on sentiment and actions featured in the videos.

According to one embodiment of the disclosure, an example method for providing personalized video featuring multiple persons may include enabling, by a computing device, a communication chat between a user of the computing device and at least one further user of at least one further computing device. The method may continue with receiving, by the computing device, a user selection of a video from the one or more personalized videos stored in the computing device. The video may include at least one frame having at least a target face and at least one further target face. The method may continue with receiving, by the computing device, an image of a source face and a further image of a further source face. Upon receiving the image of the source face and the further image of the further source face, the image of the source face may be modified to generate an image of a modified source face and the further image of the further source face may be modified to generate an image of a modified further source face. The modified source face may adopt a facial expression of the target face and the modified further source face may adopt a facial expression of the at least one further target face. In the at least one frame of the video, the target face may be replaced with the image of modified source face and the at least one further face may be replaced with the modified further source face to generate a personalized video. The personalized video may be sent to the at least one further user via the communication chat.

According to one embodiments of the disclosure, a method for providing personalized videos featuring multiple persons is disclosed. The method may commence with enabling, by a computing device, a communication chat between a user of the computing device and at least one further user of at least one further computing device. The method may further include receiving, by the computing device, a user selection of a video from the one or more personalized videos stored in the computing device. The video may include at least one frame having at least a target face and at least one further target face. The method may continue with receiving, by the computing device, an image of a source face and a further image of a further source face. In an example embodiment, the image of the source face may be received as a user selection of a pre-generated image from a set of images stored in a memory of the computing device. The pre-generated image can be segmented into portions including the source face and a background. In another example embodiment, the image of the source face may be received by capturing, by a camera of the computing device, a new image and segmenting the new image into portions including the source face and a background. Additionally, user permissions to use the image of the source face for generating further personalized videos on the at least one further computing device can be received. Upon receiving the user permissions, an indication of the user permissions and the image of the source face can be sent to the at least one further computing device.

In an example embodiment, the further image of the further source face can be received as a user selection of a pre-generated image from a set of images stored in a memory of the computing device. The pre-generated image can be segmented into portions including the further source face and a background. The further image of the further source face can be received from the at least one further computing device.

The method may further include modifying the image of the source face to generate an image of a modified source face and modifying the further image of the further source face to generate an image of a modified further source face. The modified source face may adopt a facial expression of the target face. Similarly, the modified further source face may adopt a facial expression of the at least one further target face. The method may then continue with replacing, in the at least one frame of the video, the target face with the image of modified source face and the at least one further face with the modified further source face to generate a personalized video. The personalized video may be sent to the at least one further user via the communication chat. Prior to modifying the further image of the further source face, it may be determined that the at least one further user has provided a permission to use the further image of the further source face for generating the personalized video.

The method may further include, prior to modifying the image of the source face, determining, based on the target face in the at least one frame, target facial expression parameters associated with a parametric face model. The at least one frame may include metadata, such as the target facial expression parameters. In this case, the modifying of the image of the source face may further include determining, based on the image of the source face, source parameters associated with the parametrical face model, the parameters including source facial expression parameters, source facial identity parameters, and source facial texture parameters. Based on the parametrical face model and target facial expression parameters, source facial identity parameters, and source facial texture parameters, the image of modified source face may be synthesized.

The method may further include, prior to modifying the further image of the further source face, determining, based on the further target face in the at least one frame, target facial expression parameters associated with a parametric face model. In this case, the modifying of the further image of the further source face may include determining, based on the further image of the further source face, source parameters associated with the parametrical face model, the source parameters including source facial expression parameters, source facial identity parameters, and source facial texture parameters. Based on the parametrical face model and the target facial expression parameters, the source facial identity parameters, and the source facial texture parameters, the further image of modified further source face can be synthesized.

According to one example embodiment, a system for providing personalized videos featuring multiple persons is disclosed. The system may include at least one processor and a memory storing processor-executable codes. Upon executing the processor-executable codes, the at least one processor may be configured to enable, by a computing device, a communication chat between a user of the computing device and at least one further user of at least one further computing device. The at least one processor may be further configured to receive, by the computing device, a user selection of a video from the one or more personalized videos stored in the computing device. The video may include at least one frame having at least a target face and at least one further target face. The at least one processor may be further configured to receive, by the computing device, an image of a source face and a further image of a further source face. Specifically, the image of the source face may be received as a user selection of a pre-generated image from a set of images stored in a memory of the computing device. The pre-generated image may be segmented into portions including the source face and a background. In another example embodiment, the image of the source face may be received by capturing, by a camera of the computing device, a new image and segmenting the new image into portions including the source face and a background. Additionally, a user permission to use the image of the source face for generating further personalized videos on the at least one further computing device may be received. Upon receiving the user permissions, an indication of the user permissions and the image of the source face may be sent to the at least one further computing device. The further image of the further source face may be received as a user selection of a pre-generated image from a set of images stored in a memory of the computing device. The pre-generated image may be segmented into portions including the further source face and a background. The further image of the further source face may be received from the at least one further computing device.

Upon receiving the image of the source face and the further image of the further source face, the at least one processor may modify the image of the source face to generate an image of a modified source face and modify the further image of the further source face to generate an image of a modified further source face. The modified source face may adopt a facial expression of the target face. The modified further source face may adopt a facial expression of the at least one further target face. The at least one processor may be further configured to replace, in the at least one frame of the video, the target face with the image of modified source face and the at least one further face with the modified further source face to generate a personalized video. The personalized video may be sent to the at least one further user via the communication chat.

In some example embodiments, prior to modifying the further image of the further source face, the at least one processor may determine that the at least one further user has provided a permission to use the further image of the further source face for generating the personalized video.

In an example embodiment, prior to modifying the image of the source face, the at least one processor may determine, based on the target face in the at least one frame, target facial expression parameters associated with a parametric face model. The at least one frame may include metadata, such as the target facial expression parameters. The image of the source face may be modified as follows. First, source parameters associated with the parametrical face model may be determined based on the image of the source face. The source parameters may include source facial expression parameters, source facial identity parameters, and source facial texture parameters. Then, the image of the modified source face may be synthesized based on the parametrical face model and target facial expression parameters, source facial identity parameters, and source facial texture parameters.

According to yet another aspect of the disclosure, there is provided a non-transitory processor-readable medium, which stores processor-readable instructions. When the processor-readable instructions are executed by a processor, they cause the processor to implement the above-mentioned method for providing personalized videos featuring multiple persons.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

Referring now to the drawings, example embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for providing personalized videos featuring multiple persons can be practiced. The environment 100 may include a computing device 105, a user 102, a computing device 110, a user 104, a network 120, and messenger services system 130. The computing device 105 and computing device 110 can refer to a mobile device such as a mobile phone, smartphone, or tablet computer. In further embodiments, however, the computing device 105 or computing device 110 can refer to a personal computer, laptop computer, netbook, set top box, television device, multimedia device, personal digital assistant, game console, entertainment system, infotainment system, vehicle computer, or any other computing device.

The computing device 105 and the computing device 110 can be communicatively connected to messenger services system 130 via the network 120. The messenger services system 130 can be implemented as a cloud-based computing resource(s). The messenger services system can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing device 110. During the communication chat the user 102 and the user 104 may exchange text message, images, and videos. The videos may include personalized videos. The personalized videos can be generated based on pre-generated videos stored in the computing device 105 or the computing device 110. In some embodiments, the pre-generated videos can be stored in the messenger services system 130 and downloaded to the computing device 105 or the computing device 110 on demand.

The messenger services system 130 may be also configured to store user profiles 135. The user profiles 135 may include images of the face of the user 102, images of the face of the user 104, and images of faces of other persons. The user profiles 135 may include user permissions specified by the user 102, the user 104 or other users. The user permissions specified by the user 102 may allow or disallow using the images of faces of the user 102 for generating personalized videos by users of other computing device, for example, the user 104. Correspondently, the user permissions specified by the user 104 may allow or disallow using the images of faces of the user 104 for generating personalized videos by users of other computing device, for example, by the user 102. The images of the faces can be downloaded to the computing device 105 or the computing device 110 on demand and based on the user permissions.

The images of the face of the user 102 can be generated using the computing device 105 and stored in a local memory of the computing device 105. The images of the faces can be generated based on other images stored in the computing device 105. The images of the faces can be further used by the computing device 105 to generate personalized videos based on the pre-generated videos. After generating an image of face using the computing device 105, the user 102 may indicate user permissions to allow or disallow other users of other computing devices to use the image of the face for generating personalized videos. The image of the face and the user permissions can be further provided to the messenger services system 130 for storage in the user profiles 135.

Similarly, the computing device 110 may be used to generate images of the face of the user 104. The images of the face of the user 104 can be used to generate personalized videos on the computing device 110. In further embodiments, the images of the face of user 102 and images of the face of the user 104 can be mutually used to generate personalize videos on the computing device 105 or the computing device 110. After generating an image of the face using the computing device 110, the user 104 may indicate user permissions to allow or disallow other users of other computing devices to use the image of face for generating personalized videos. The image of the face and the user permissions can be further provided to the messenger services system 130 for storage in the user profiles 135.

Figure 2:
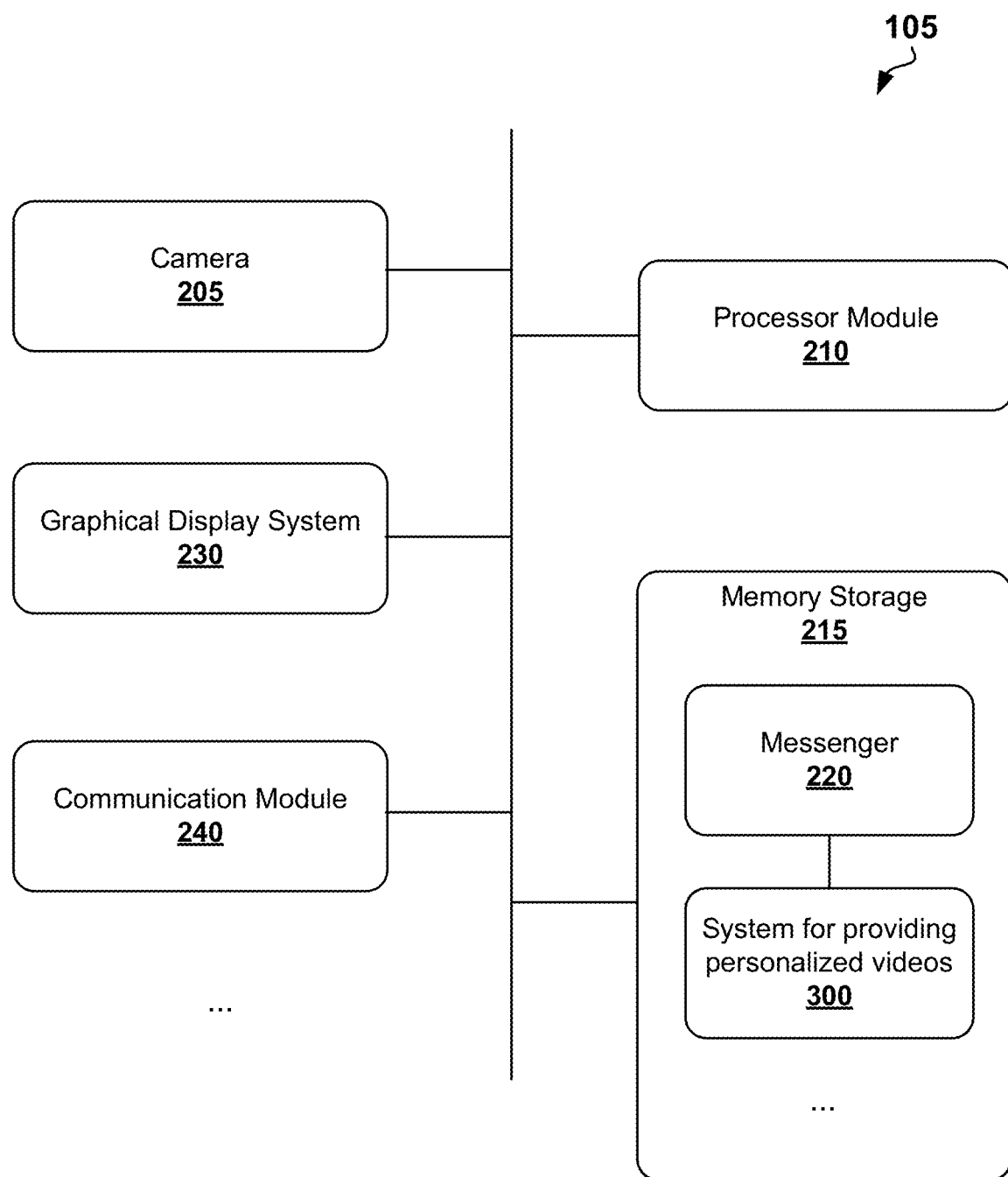
FIG. 2 is a block diagram showing an example embodiment of a computing device for implementing methods for providing personalized videos featuring multiple persons.

FIG. 2 is a block diagram showing an example embodiment of a computing device 105 (or computing device 110) for implementing methods for personalized videos. In the example shown in FIG. 2, the computing device 110 includes both hardware components and software components. Particularly, the computing device 110 includes the camera 205 or any other image-capturing device or scanner to acquire digital images. The computing device 110 can further include a processor module 210 and a memory storage 215 for storing software components and processor-readable (machine-readable) instructions or codes, which when performed by the processor module 210, cause the computing device 105 to perform at least some steps of methods for providing personalized videos featuring multiple persons as described herein. The computing device 105 may include graphical display system 230 and a communication module 240. In other embodiments, the computing device 105 may include additional or different components. Moreover, the computing device 105 can include fewer components that perform functions similar or equivalent to those depicted in FIG. 2.

The computing device 110 can further include a messenger 220 for enabling communication chats with another computing device (such as the computing device 110) and a system 300 for providing personalized videos featuring multiple persons. The system 300 is described in more detail below with reference to FIG. 3. The messenger 220 and the system 300 may be implemented as software components and processor-readable (machine-readable) instructions or codes stored in the memory storage 215, which when performed by the processor module 210, cause the computing device 105 to perform at least some steps of methods for providing communication chats and personalized videos as described herein.

In some embodiments, the system 300 for providing personalized videos featuring multiple persons can be integrated in the messenger 220. A user interface of the messenger 220 and the system 300 for providing the personalized videos can be provided via the graphical display system 230. The communication chats can be enabled via the communication module 240 and the network 120. The communication module 240 may include a GSM module, a WiFi module, a Bluetooth™ module and so forth.

Figure 3:
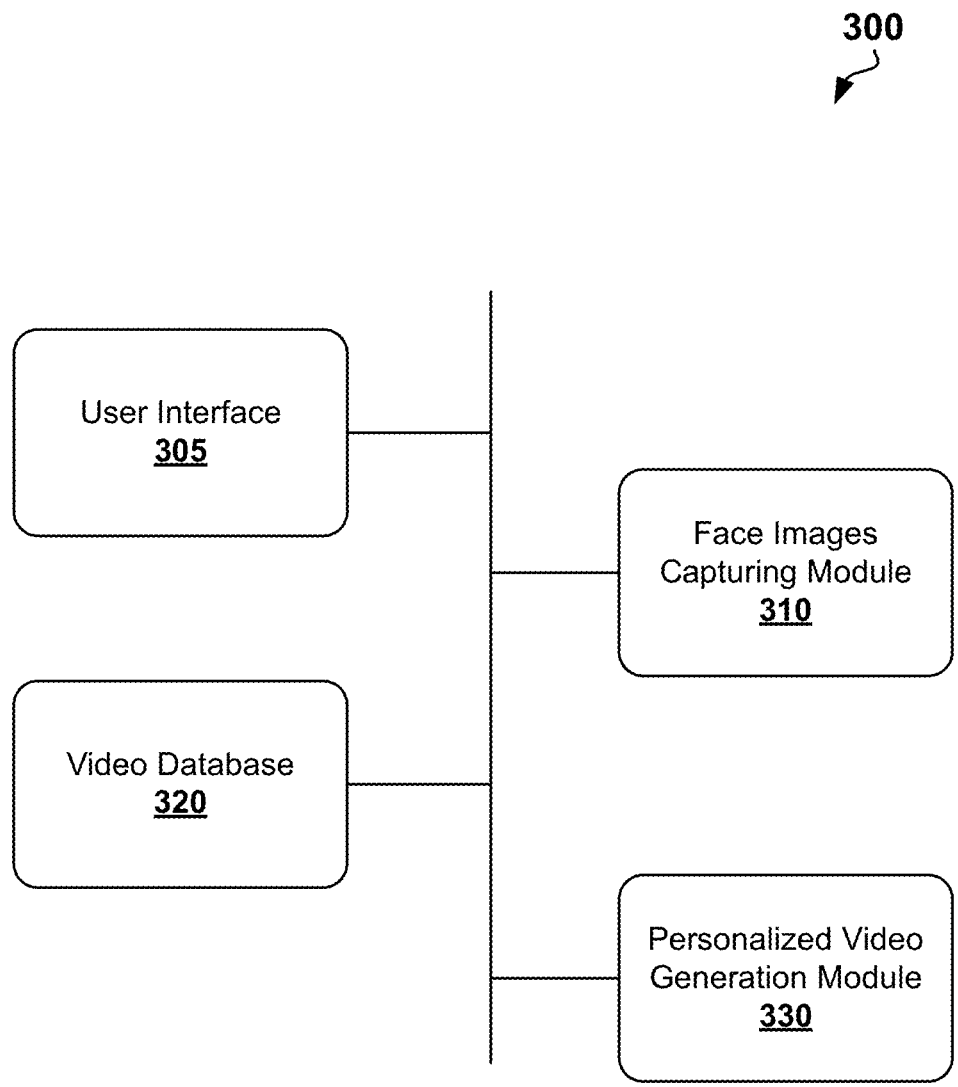
FIG. 3 is a block diagram showing a system for providing personalized videos featuring multiple persons, according to some example embodiment of the disclosure.

FIG. 3 is a block diagram of a system 300 for providing personalized videos featuring multiple persons, according to some example embodiment of the disclosure. The system 300 may include a user interface 305, a face images capturing module 310, a video database 320, and a personalized video generation module 330.

The video database 320 may store one or more videos. The videos can include previously recorded videos featuring an actor or multiple actors. The videos may include 2D videos or 3D scenes. The videos can be pre-processed to segment the actors' faces (also referred to as target faces) and background in each frame and to identify a set of parameters that can be used for further insertion of a source face instead of the face of the actor (the target face). The set of parameters can include a face texture, facial expression parameters, face color parameters, facial identity parameters, coordinates, position, angle of the target faces, and so forth. The set of parameters may also include a list of manipulations and operations that can be carried out on the actors' faces such as the replacement of the actors' faces performed in a photo-realistic manner.

The face images capturing module 310 can receive an image of a person and generate an image of the face of the person. The image of the face of the person can be used as a source face to replace target face in the videos stored in the video database 320. The image of the person can be captured by the camera 205 of the computing device 105. The image of the person can include an image stored in the memory storage 215 of the computing device 105. Details for the face images capturing module 310 are provided in FIG. 7.

The personalized video generation module 330 can generate, based on an image of one or more source faces, a personalized video from one or more pre-generated videos stored in video database 320. The personalized video generation module 330 may replace one or more faces of the actors in a pre-generated video with the source faces while keeping the facial expression of the faces of the actors. The personalized video generation module 330 may replace a face texture, face color, and facial identity of one of the actors with face texture, face color, and facial identity of one of the source faces. The module 330 may also add an image of glasses over eye region of the source face in the personalized video. Similarly, the personalized video generation module 330 may add an image of a headwear (for example, a cap, a hat, a helmet, and so forth) over head of the source face in the personalized video. The image(s) of the glasses and headwear can be pre-stored in the computing device 105 of the user or generated. The images of the glasses and headwear can be generated using a deep neural network (DNN). The personalized video generation module 330 may also apply a shade or a color to the source face of in the personalized video. For example, the personalized video generation module 330 may add suntan to the face of the source face.

Figure 4:
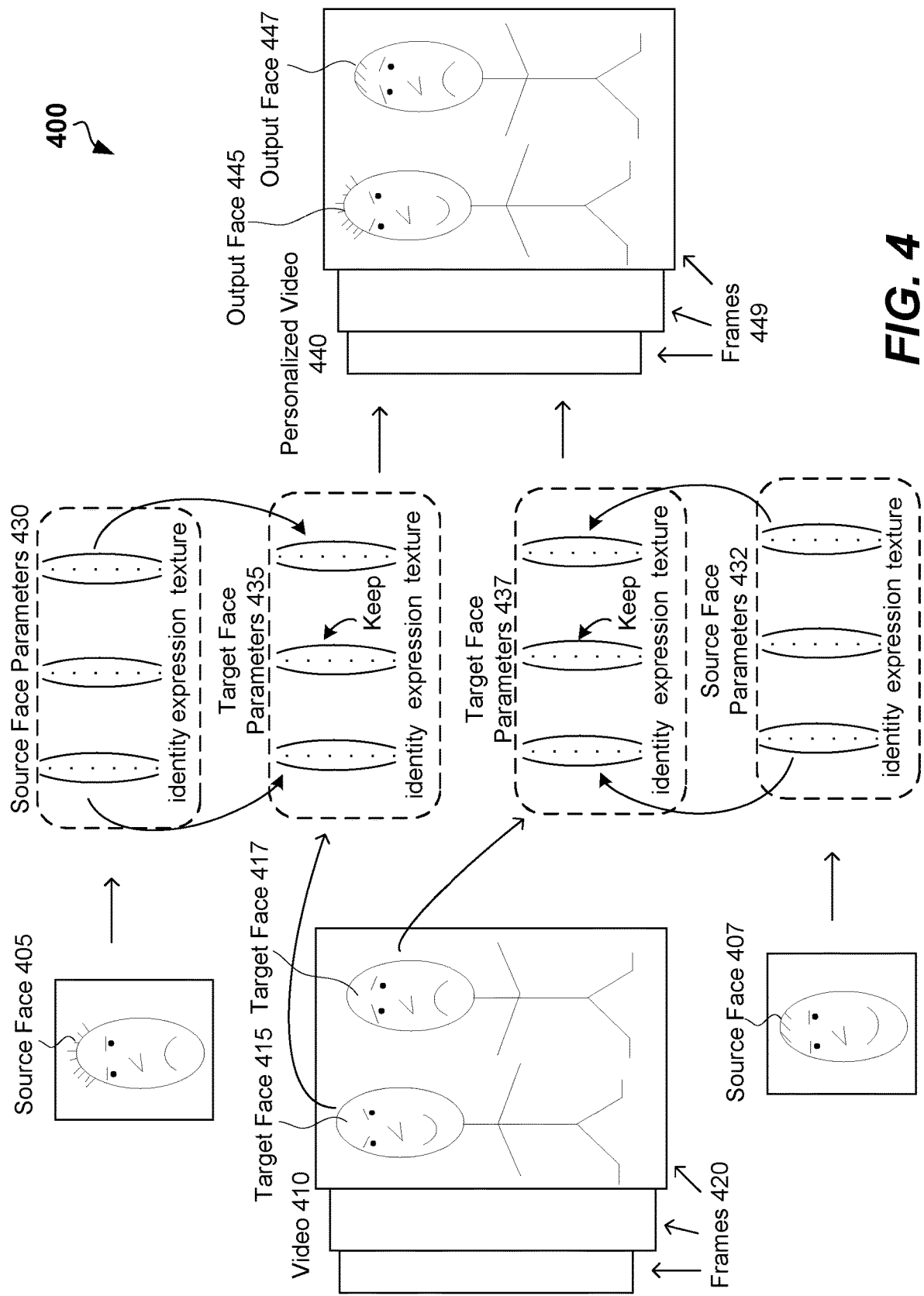
FIG. 4 is a schematic showing a process of generation of a personalized video featuring multiple persons, according to an example embodiment.

FIG. 4 is a schematic showing functionality 400 of the personalized video generation module 330, according to some example embodiments. The personalized video generation module 330 may receive an image of a source face 405, an image of a source face 407, and a pre-generated video 410. The pre-generated video 410 may include one or more frames 420. The frames 420 may include a target face 415 and a target face 417. The facial expression of the source face 405 can be different from the facial expression of target face 415 or the facial expression of the target face 417. The facial expression of the source face 407 can differ from the facial expression of target face 415 or the facial expression of the target face 417.

In some embodiments of the disclosure, the personalized video generation module 330 can be configured to analyze the image of the source face 405 to extract source face parameters 430. The personalized video generation module 330 can also analyze the image of the source face 407 to extract source face parameters 432. The source face parameters 430 can be extracted by fitting a parametric face model to the image of the source face 405. Correspondingly, the source face parameters 432 can be extracted by fitting a parametric face model to the image of the source face 407. The parametric face model may include a template mesh. Coordinates of vertices in the template mesh may depend on two parameters: a facial identity and a facial expression. Thus, the source face parameters 430 may include a facial identity and facial expression corresponding to the source face 405. The source face parameters 432 may include a facial identity and facial expression corresponding to the source face 407. The source face parameters 430 may include a texture of the source face 405. The source face parameters 430 may further include a texture of the source face 407. The texture may include colors at vertices in the template mesh. In some embodiments, a texture model associated with the template mesh can be used to determine the texture of the source face 405 and the texture of the source face 407.

In some embodiments of the disclosure, the personalized video generation module 330 can be configured to analyze the frames 420 of the pre-generated video 410 to extract target face parameters 435 and target face parameters 437 for each of the frames 420. The target face parameters 435 can be extracted by fitting the parametric face model to the target face 415. The target face parameters 435 may include facial identity and facial expression corresponding to the target face 415. The target face parameters 435 may further include texture of the target face 415. The texture of the target face 415 can be obtained using the texture model. Similarly, the target face parameters 437 can be extracted by fitting the parametric face model to the target face 417. The target face parameters 437 may include facial identity and facial expression corresponding to the target face 417. The target face parameters 437 may further include texture of the target face 417. The texture of the target face 417 can be obtained using the texture model.

In some embodiments of the present disclosure, each of the frames 420 may include metadata. The metadata may include the target face parameters 435 and the target face parameters 437 determined for the frame. For example, the target face parameters 435 and the target face parameters 437 can be determined by the messenger services system 130 (shown in FIG. 1). The target face parameters 435 and the target face parameters 437 can be stored in metadata of the frames 420 of the pre-generated video 410. The pre-generated video 410 can be further downloaded to the computing device 105 and stored in video database 320.

Alternatively, the personalized video generation module 330 can pre-process the pre-generated video 410 to determine the target face parameters 435 and the target face parameters 437 and location parameters of the target face 415 and the target face 417 in the frames 420. The personalized video generation module 330 may further store the target face parameters 435, the target face parameters 437, and location parameters of the target faces in the metadata of the corresponding frames 420. This way, the target face parameters 435 and the target face parameters 437 are not recomputed each time the pre-generated video 410 is selected for personalization with different source faces.

In some embodiments of the disclosure, the personalized video generation module 330 can be further configured to replace the facial expression in source face parameters 430 with the facial expression from the target face parameters 435. The personalized video generation module 330 can further replace the facial expression in source face parameters 432 with the facial expression from the target face parameters 437. The personalized video generation module 330 can further synthesize an output face 445 using the parametric face model, texture model, and source face parameters 430 with the replaced facial expression. The personalized video generation module 330 can further synthesize an output face 447 using the parametric face model, texture model, and source face parameters 432 with the replaced facial expression. The output face 445 can be used to replace the target face 415 in frame of the pre-generated video 410. The output face 447 can be used to replace the target face 417 in frame of the pre-generated video 410. The frames 449 of the personalized video 440 can be generated by repeating, for each frame 420 of the pre-generated video 410, the steps of replacing the facial expression parameters in source face parameters 430 and source face parameters 432, synthesizing the output face 445 and the output face 447, replacing the target face 415 with the output face 445, and replacing the target face 417 with the output face 447. The output face 445 is the source face 405 adopting the facial expression of the target face 415. The output face 447 is the source face 405 adopting the facial expression of the target face 417. The output video is the personalized video 440 generated based on the pre-generated video 410 and the image of the source face 405 and the image of the source face 407.

Figure 5:
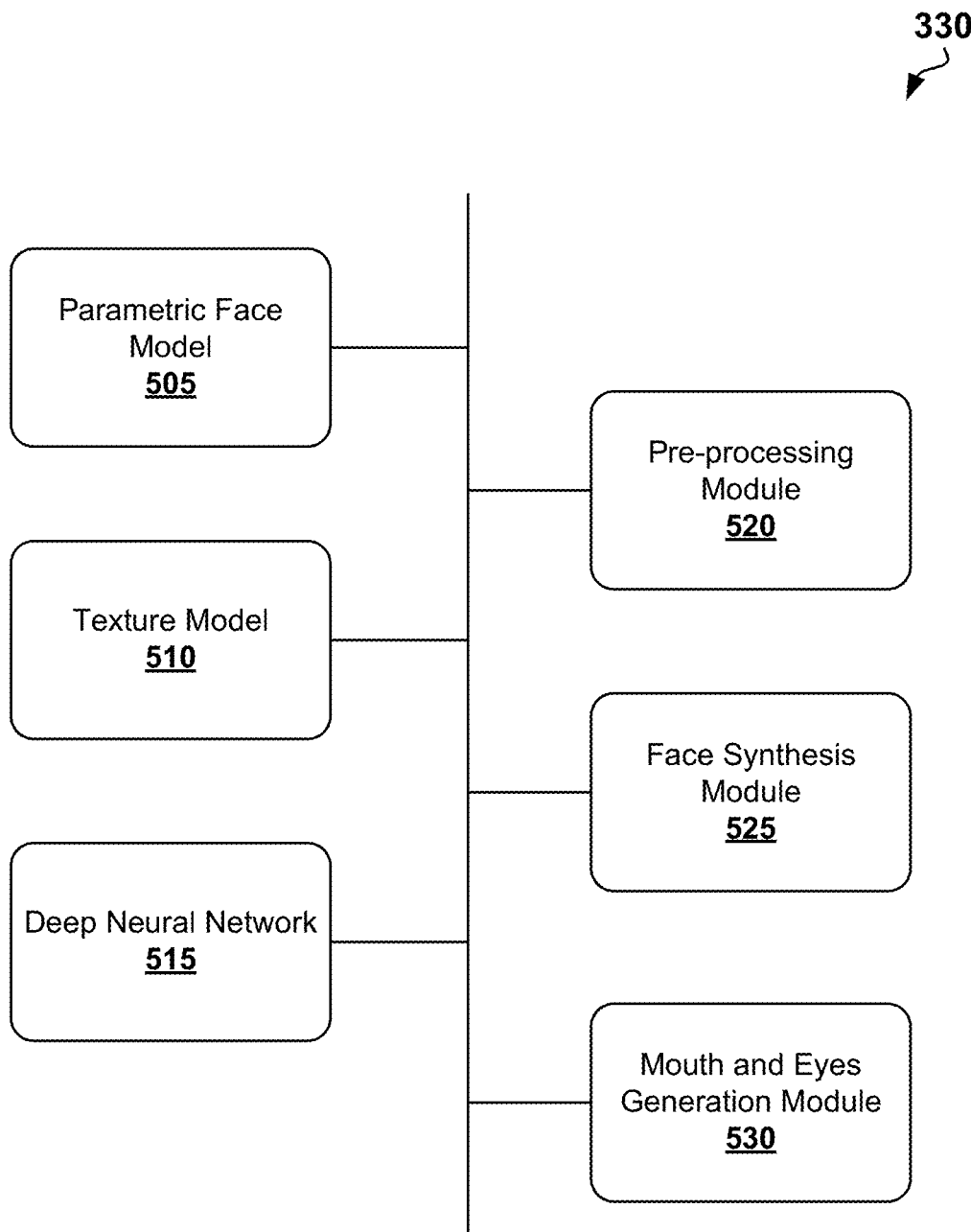
FIG. 5 a block diagram of a personalized video generation module, according to some example embodiment of the disclosure.

FIG. 5 is a block diagram of the personalized video generation module 330, according to one example embodiment. The personalized video generation module 330 can include a parametric face model 505, a texture model 510, a DNN 515, a pre-processing module 520, a face synthesis module 525, and a mouth and eyes generation module 530. The modules 505-530 can be implemented as software components for use with hardware devices such as computing device 105, the computing device 110, the messenger services system 130, and the like.

In some embodiments of the disclosure, the parametric face model 505 can be pre-generated based on images of a pre-defined number of individuals of different age, gender, and ethnic background. For each individual, the images may include an image of the individual having a neutral facial expression and one or more images of the individual having different facial expressions. The facial expression may include open mouth, smile, anger, astonishment, and so forth.

The parametric face model 505 may include a template mesh with a pre-determined number of vertices. The template mesh may be represented as a 3D triangulation defining a shape of a head. Each individual can be associated with an individual-specific blend shape. The individual-specific blend shape can be adjusted to the template mesh. The individual-specific blend shape can correspond to specific coordinates of vertices in the template mesh. Thus, different images of individuals can correspond to the template mesh of the same structure; however, coordinates of vertices in the template mesh are different for the different images.

In some embodiments of the disclosure, the parametric face model may include a bilinear face model depending on two parameters, facial identity and facial expression. The bilinear face model can be built based on blend shapes corresponding to the images of individuals. Thus, the parametric face model includes the template mesh of a pre-determined structure, wherein the coordinates of vertices depend on the facial identity and facial expression.

In some embodiments of the disclosure, the texture model 510 can include a linear space of texture vectors corresponding to images of the individuals. The texture vectors can be determined as colors at vertices of the template mesh.

The parametric face model 505 and the texture model 510 can be used to synthesize a face based on known parameters of facial identity, facial expression, and texture. The parametric face model 505 and the texture model 510 can be also used to determine unknown parameters of facial identity, facial expression, and texture based on a new image of a new face.

Synthesis of a face using the parametric face model 505 and the texture model 510 is not time-consuming; however, the synthesized face may not be photorealistic, especially in the mouth and eyes regions. In some embodiments of the disclosure, the DNN 515 can be trained to generate photorealistic images of the mouth and eye regions of a face. The DNN 515 can be trained using a collection of videos of talking individuals. The mouth and eyes regions of talking individuals can be captured from frames of the videos. The DNN 515 can be trained using a generative adversarial network (GAN) to predict the mouth and eyes regions of the face based on a pre-determined number of previous frames of the mouth and eyes regions and desired facial expression of a current frame. The previous frames of the mouth and eyes regions can be extracted at specific moment parameters for facial expression. The DNN 515 may allow synthesizing mouth and eyes regions with desired parameters for facial expression. The DNN 515 may also allow utilizing previous frames to obtain spatial coherence.

The GAN performs the conditioning on mouth and eyes regions rendered from a face model, current expression parameters, and embedding features from previously generated images and produces the same but more photorealistic regions. The mouth and eyes regions generated using the DNN 515 can be used to replace the mouth and eye regions synthesized by the parametric face model 505. It should be noted that synthesizing mouth and eye regions by the DNN 515 may be less time-consuming than synthesizing, by the DNN 515, an entire face. Therefore, generation of mouth and eye regions using the DNN 515 can be carried out in real time, by, for example, one or more of processors of a mobile device, such as a smartphone or a tablet.

In some embodiments, the pre-processing module 520 can be configured to receive a pre-generated video 410 and an image of a source face 405. The pre-generated video 410 may include a target face. The pre-processing module 520 can be further configured to perform a segmentation of at least one frame of the target video to obtain images of the target face 415 and a target background. The segmentation can be carried out using neural networks, matting, and smoothing.

In some embodiments, the pre-processing module 520 can be further configured to determine, using the parametric face model 505 and the texture model 510, a set of target face parameters based on at least one frame of the pre-generated video 410. In some embodiments, the target parameters may include target facial identity, target facial expression, and target texture. In some embodiments, the pre-processing module 520 may be further configured to determine, using the parametric face model 505 and the texture model 510, a set of source face parameters based on the image of the source face 405. The set of source face parameters may include source facial identity, source facial expression, and source texture.

In some embodiments, the face synthesis module 525 can be configured to replace the source facial expression in the set of source face parameters with the target facial expression to obtain a set of output parameters. The face synthesis module 525 can be further configured to synthesize an output face using the output set of parameters and the parametric face model 505 and texture model 510.

In some embodiments, two-dimensional (2D) deformations can be applied to the target face to obtain photorealistic images of regions of the output face which are hidden in the target face. The parameters of the 2D deformations can be determined based on the source set of parameters of the parametric face model.

In some embodiments, the mouth and eyes generation module 530 can be configured to generate mouth and eye regions using DNN 515 based on the source facial expression and at least one previous frame of the pre-generated video 410. The mouth and eyes generation module 530 can be further configured to replace mouth and eyes regions in an output face synthesized with the parametric face model 505 and texture model 510 with mouth and eye regions synthesized with DNN 515.

Figure 6:
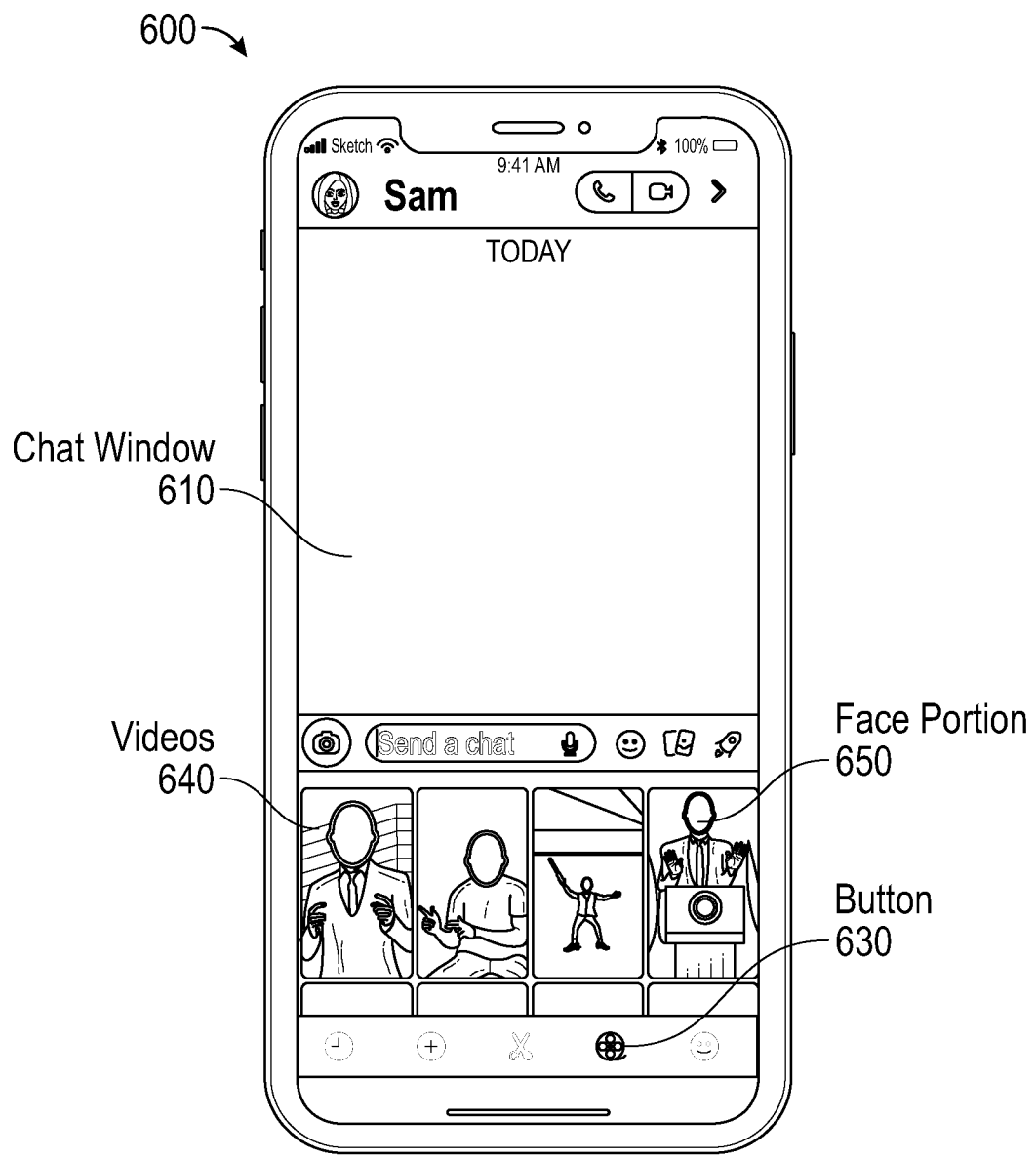
FIGS. 6-9 show screens of a user interface of a system for providing personalized videos featuring multiple persons in a messenger, according to some example embodiments.

FIG. 6 shows an example screen of a user interface of a system for providing personalized videos featuring multiple persons in a messaging application (messenger), according to some example embodiments. The user interface 600 may include a chat window 610 and a section containing videos 640. The videos 640 may include pre-rendered videos with face portions 650 instead of faces. The pre-rendered videos may include teaser videos intended to show the user a sample representation of how the personalized video may look like. The face portions 650 may be shown in the form of white ovals. In some embodiments, the videos 640 may include several face portions 650 to enable creation of multiple-person videos, i.e., videos having faces of multiple persons. A user may tap on any of the videos 640 to select the one of the videos 640 for modifying and sending to the chat window 610. The modification may include receiving a selfie picture from the user (i.e., an image of a user face taken via a front camera of the computing device), obtaining a source face from the selfie picture, and modifying the selected video 640 by using the source face to create a personalized video, also referred herein to as a "Reel". Thus, as used herein, the Reel is a personalized video produced by modifying a video template (a video without a user face) into a video with the user face inserted. Therefore, the personalized video may be generated in the form of an audiovisual media (e.g., a video, an animation, or any other type of media) that features a face of a user or faces of several users. The modified video can be sent to the chat window 610. The user interface 600 may further have a button 630 upon tapping on which the user can be transitioned from the messaging application to the system for providing personalized videos featuring multiple persons according to the present disclosure and use the functionality of the system.

Figure 7:
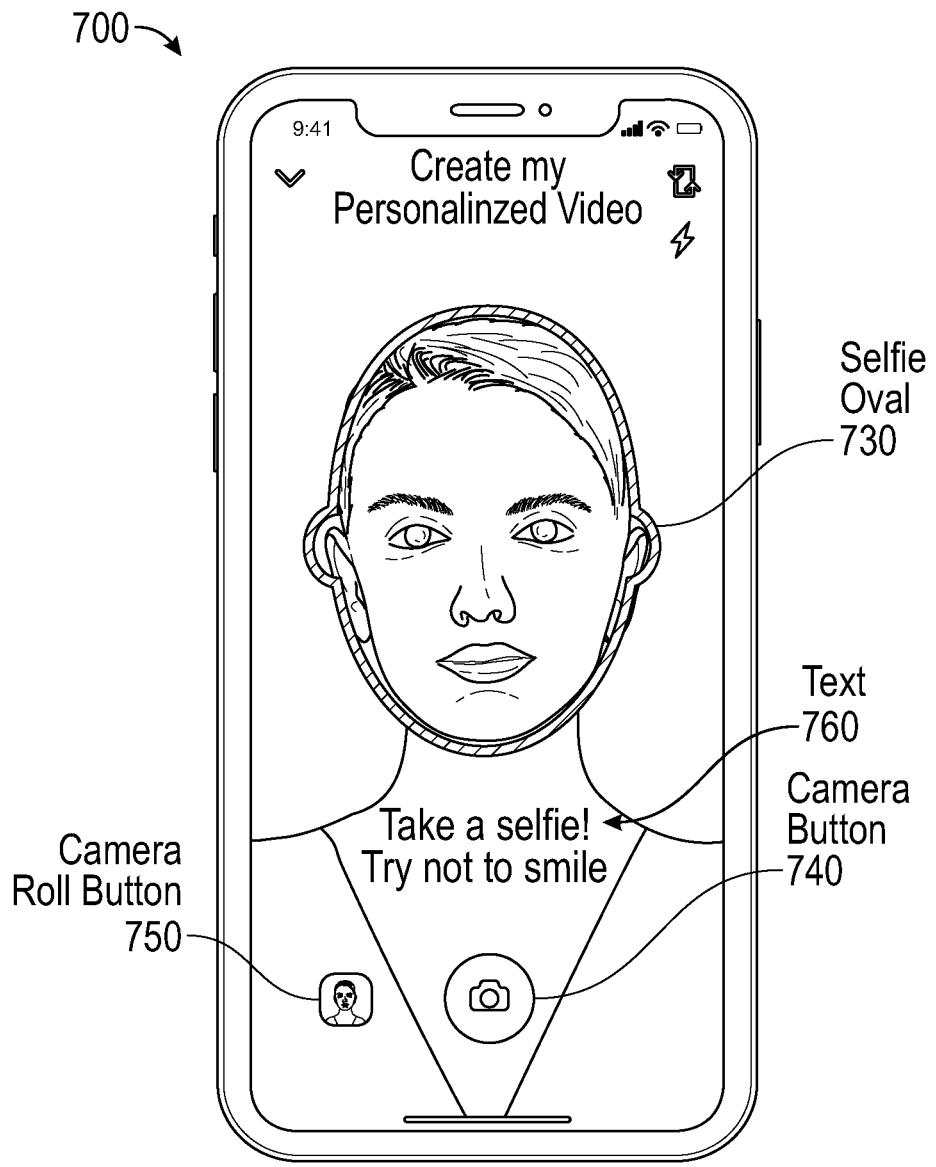

FIG. 7 shows an example screen of a user interface 700 of a system for providing personalized videos featuring multiple persons in a messenger, according to some example embodiments. The user interface 700 shows a selfie capturing mode in which a user may take an image of the user face, which is then used as a source face. The user interface 700 shows a live view of a camera of a computing device when the user intends to capture the selfie image. The live view may show the user face. The user interface 700 may show a selfie oval 730 and a camera button 740. In an example embodiment, the camera button 740 may slide up from a bottom of the screen in the selfie capturing mode. The user may need to change the position of the camera in order to position the user face within the boundaries of the selfie oval 730.

The selfie oval 730 may be shown by a bold continuous line and the camera button 740 may be shown as opaque and actionable to indicate that the camera button 740 is now active. To notify the user, the text 760 may be displayed below the selfie oval 730. The text 760 may instruct the user to make the selfie picture, e.g., "Take a selfie," "Try not to smile," and so forth. The user may make the selfie picture by pressing the camera button 740. In some embodiments, the user may select an existing selfie picture from a picture gallery by pressing a camera roll button 750.

Figure 8:
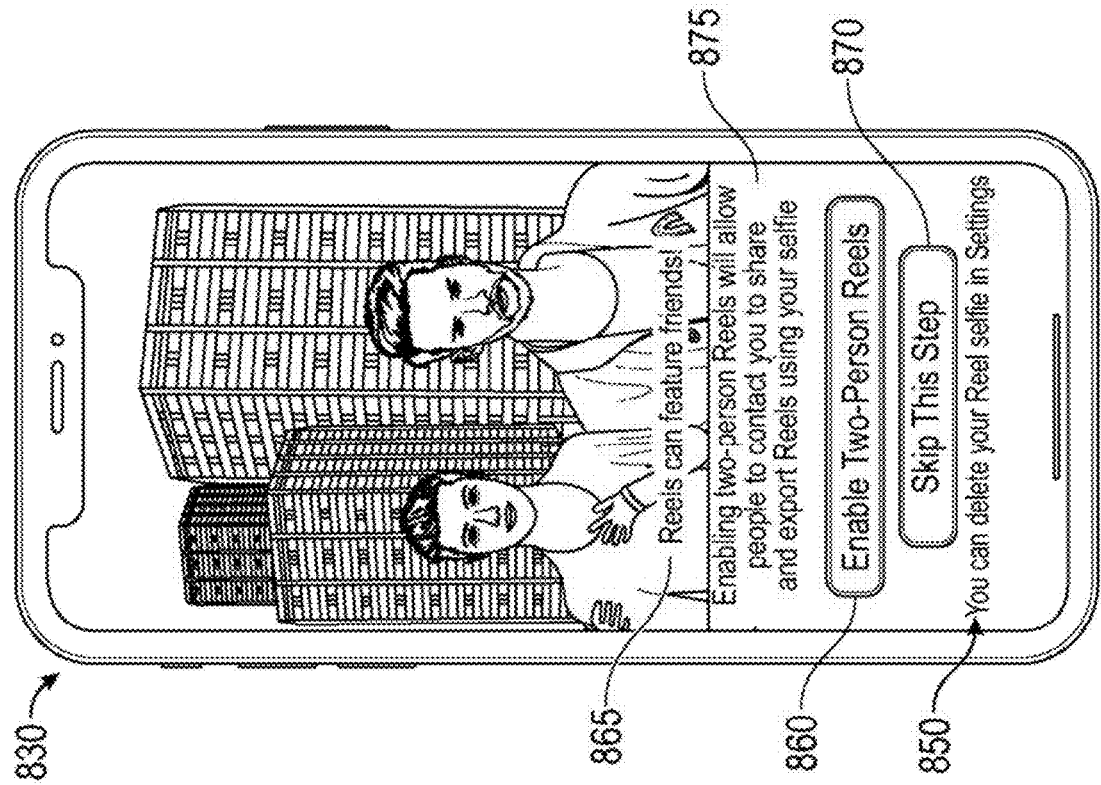
Figure 8:
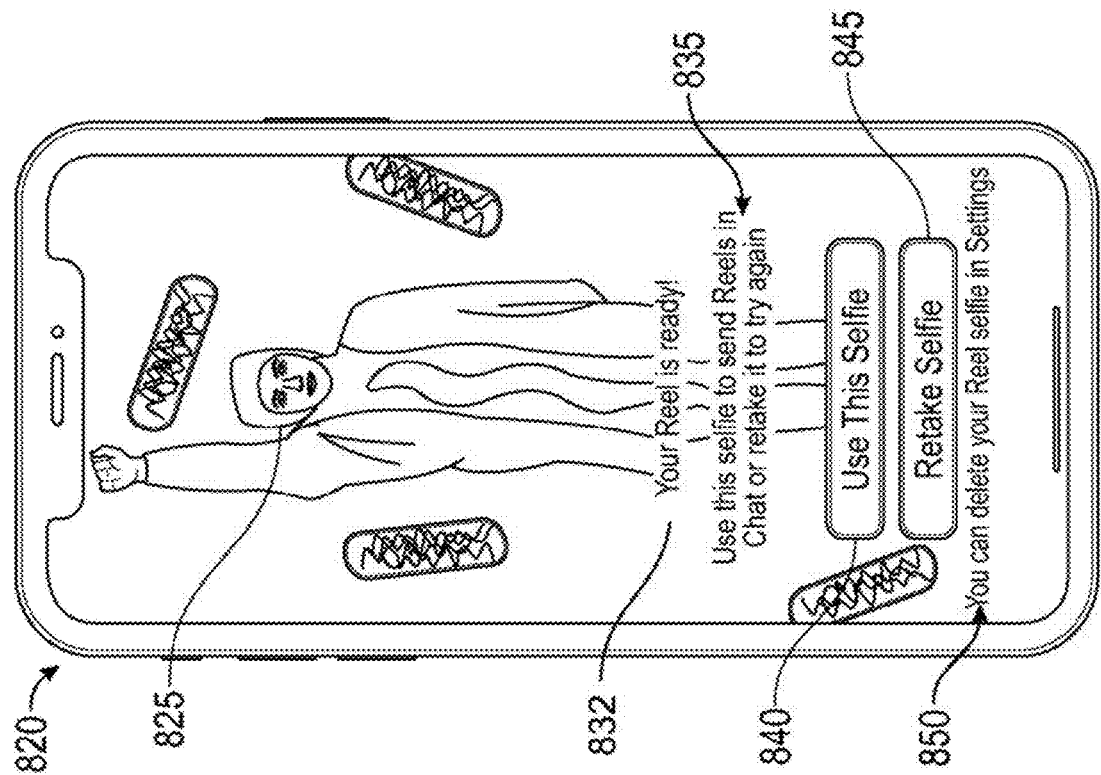

FIG. 8 shows an example screen of user interfaces 820 and 830 of a system for providing personalized videos featuring multiple persons in a messenger, according to some example embodiments. The user interfaces 820 and 830 are shown on the screen after the user takes a selfie picture. The user interface 820 may show a Reel 825 that was created and text portions 832 and 835. The Reel 825 may be shown in a full screen mode. The text portion 832 may include, e.g., "Your Reel is ready." A dark color gradient may be provided above behind the Reel 825 and the text portion 832 may be visible. The text portion 835 may display, for example, "Use this selfie to send Reels in Chat or retake it to try again" to notify the user that the user may either use the selfie picture already taken by the user or take another selfie picture. Additionally, two buttons may be shown on the user interface 820. A button 840 may be shown with a blue and filled background and may instruct the user to "Use this Selfie." A button 845 may be shown with a white, outlined, and transparent background and may instruct the user to "Retake Selfie." When the user taps the button 845, the user interface 700 shown on FIG. 7 may be activated and the step of creation of a Reel may be initiated as described with reference to FIG. 7. The user interface 820 may further show a subtext 850 below the buttons 840 and 845. The subtext 850 may inform how the user may delete Reel, e.g., "You can delete your Reels selfie in Settings." After tapping "Use this Selfie" button 840, the user may be transitioned to the user interface 830.

The user interface 830 may enable creating Reels featuring multiple persons, such as two-person Reels. The user interface 830 may include animation. For example, text moves off the screen to the left for a predetermined distance and fades for a predetermined time as new text comes on from a predetermined distance to the right and becomes less faded over a predetermined time. The two-person Reel that the user selects may be shown in a full screen mode. There may be provided a dark gradient above the Reel behind the text and the text may be visible.

The other person shown in the two-person Reel may be the last contact that the user talked to and who has already given a permission for two-person Reels. If no contact exists who gave a permission, the user may select a stock person (one of preselected persons in a library) and make the Reel with the selected person. The user interface 830 may include text 865 displaying, for example, "Reels can feature friends!" and text 875 displaying, for example, "Enabling two-person Reels will allow people to contact you to share and export Reels using your selfie."

The user may decide whether or not to enable two-person Reels. The selection of the user may affect settings in a menu in the "Who Can . . . " section of the settings, which indicates who can use the selfie pictures of the user. The "Use My Reels Selfie" setting may be shown below the "See My Location" setting in the settings. The user interface 830 may show buttons 860 and 870. When the user taps the button 860 titled "Enable Two-Person Reels", the chat window with a video portion opens as shown in FIG. 6. If the user selects "Enable Two-Person Reels", the setting titled "Use My Reels Selfie" may be set to "My Friends" to enable creating Reels with the user and friends of the user in a messenger. In the chat window, a list of personalized Reels of the user may be opened.

When the user taps the button 870 titled "Skip this Step", the step of enabling the two-person Reels screen may be skipped and the chat window with a videos portion open as shown in FIG. 6 may be opened. If the user selects "Skip this Step", the setting titled "Use My Reels Selfie" may be set to "Only Me" to enable creating Reels with the user only. In the chat window, a list of personalized Reels of the user can be then opened.

The menu may have the following options: a screen header named "Use My Reels Selfie" and the text "Who can use your Reels selfie for two-person Reels?" can be provided. The "Everyone" setting can be set if the user chooses to enable two-person Reels. This setting enables anyone who can contact the user (as determined by "Who Can Contact Me" setting) to use the selfie picture of the user. No blocked users can ever use the selfie picture of the user. The "Who can use your Reels selfie for two-person Reels?" setting can further include options "My Friends" and "Only Me." The "Only Me" option is set if the user chooses not to allow usage of the face image of the user in two-person Reels by other users. The user can change this setting any time regardless of what the user initially selected.

By enabling two-person Reels, the user provides the permission to use the selfie picture of the user on other computing devices of friends participating in the current communication chat, as well as enables showing two-person Reels in a selection area (such as an area for selecting videos 640 shown in FIG. 6).

Figure 9:
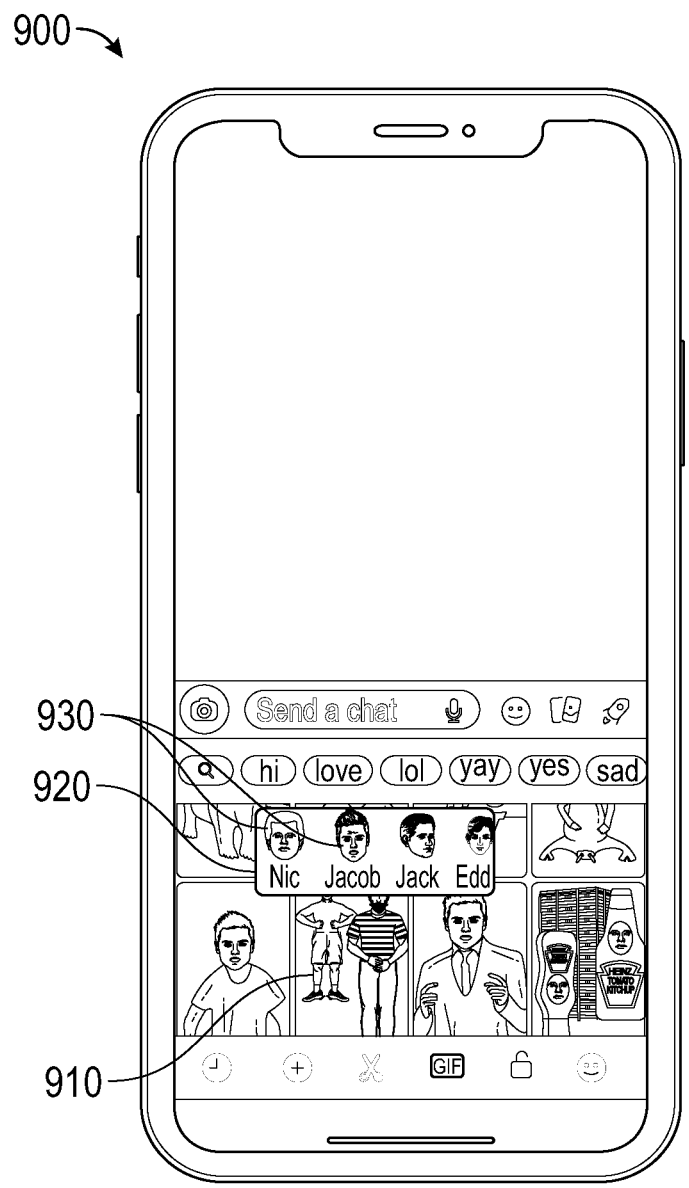

FIG. 9 shows an example screen of a user interface 900 of a system for providing personalized videos featuring multiple persons in a messenger, according to some example embodiments. The user may select a Reel 910, which is a two-person Reel. Two-person Reels may feature the user and one of the most recent members of the conversation chat who is a bidirectional friend other than the user to have sent a message. If any of other users in the conversation chat have a selfie picture and allowed the user to use their selfie picture, a friend selection menu 920 may open upon selection of the Reel 910. If more than two other members of the conversation chat have a selfie picture, the user may press and hold on any of selfie pictures 930 to select a further user among the users who allowed use of their selfie picture. The selfie pictures 930 may be sorted from left to right by the most recent conversation activity of the members of the conversation chat.

Figure 10:
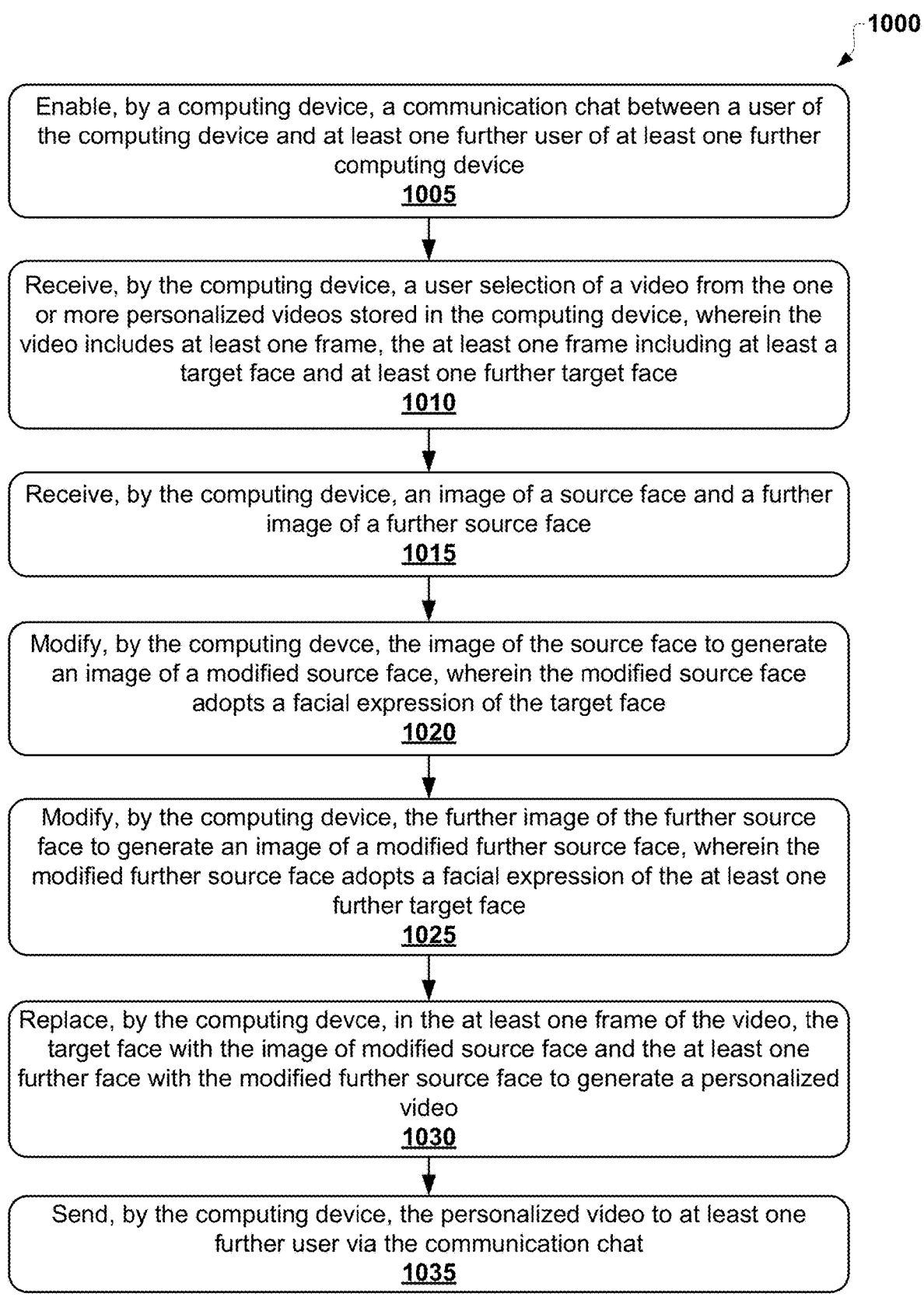
FIG. 10 is a flow chart showing a method for providing personalized videos featuring multiple persons, in accordance with an example embodiment.

FIG. 10 is a flow chart showing a method 1000 for providing personalized videos featuring multiple persons, according to an example embodiment. The method 1000 can be performed by computing device 105. The method 1000 may commence at block 1005 with enabling, by a computing device, a communication chat between a user of the computing device and at least one further user of at least one further computing device. The method may further include receiving, by the computing device, a user selection of a video from the one or more personalized videos stored in the computing device as shown in block 1010. The video may include at least one frame having at least a target face and at least one further target face. The method may continue in block 1015 with receiving, by the computing device, an image of a source face and a further image of a further source face. In an example embodiment, the image of the source face may be received as a user selection of a pre-generated image from a set of images stored in a memory of the computing device. The pre-generated image can be segmented into portions including the source face and a background. In another example embodiment, the image of the source face may be received by capturing, by a camera of the computing device, a new image and segmenting the new image into portions including the source face and a background. Additionally, a user permission to use the image of the source face for generating further personalized videos on the at least one further computing device can be received. Upon receiving the user permission, an indication of the user permission and the image of the source face can be sent to the at least one further computing device.

In an example embodiment, the further image of the further source face can be received as a user selection of a pre-generated image from a set of images stored in a memory of the computing device. The pre-generated image can be segmented into portions including the further source face and a background. The further image of the further source face may be received from the at least one further computing device.

The method may further include modifying the image of the source face to generate an image of a modified source face, as shown in block 1020, and modifying the further image of the further source face to generate an image of a modified further source face, as shown in block 1025. The modified source face may adopt a facial expression of the target face. The modified further source face may adopt a facial expression of the at least one further target face. The method may continue at block 1030 with replacing, in the at least one frame of the video, the target face with the image of modified source face and the at least one further face with the modified further source face to generate a personalized video. The personalized video may be sent to the at least one further user via the communication chat, as shown in block 1035. Prior to modifying the further image of the further source face, it can be determined that the at least one further user has provided a permission to use the further image of the further source face for generating the personalized video.

The method may, optionally, include, prior to modifying the image of the source face, determining, based on the target face in the at least one frame, target facial expression parameters associated with a parametric face model. The at least one frame may include metadata, such as the target facial expression parameters. In this case, the modifying of the image of the source face may further include determining, based on the image of the source face, source parameters associated with the parametrical face model, the parameters including source facial expression parameters, source facial identity parameters, and source facial texture parameters. Based on the parametrical face model and the target facial expression parameters, the source facial identity parameters, and the source facial texture parameters, the image of modified source face may be synthesized.

The method may optionally include, prior to modifying the further image of the further source face, determining, based on the further target face in the at least one frame, target facial expression parameters associated with a parametric face model. In this case, the modifying of the further image of the further source face may include determining, based on the further image of the further source face, source parameters associated with the parametrical face model, the source parameters including source facial expression parameters, source facial identity parameters, and source facial texture parameters. Based on the parametrical face model and the target facial expression parameters, the source facial identity parameters, and the source facial texture parameters, the further image of modified further source face may be synthesized.

Figure 11:
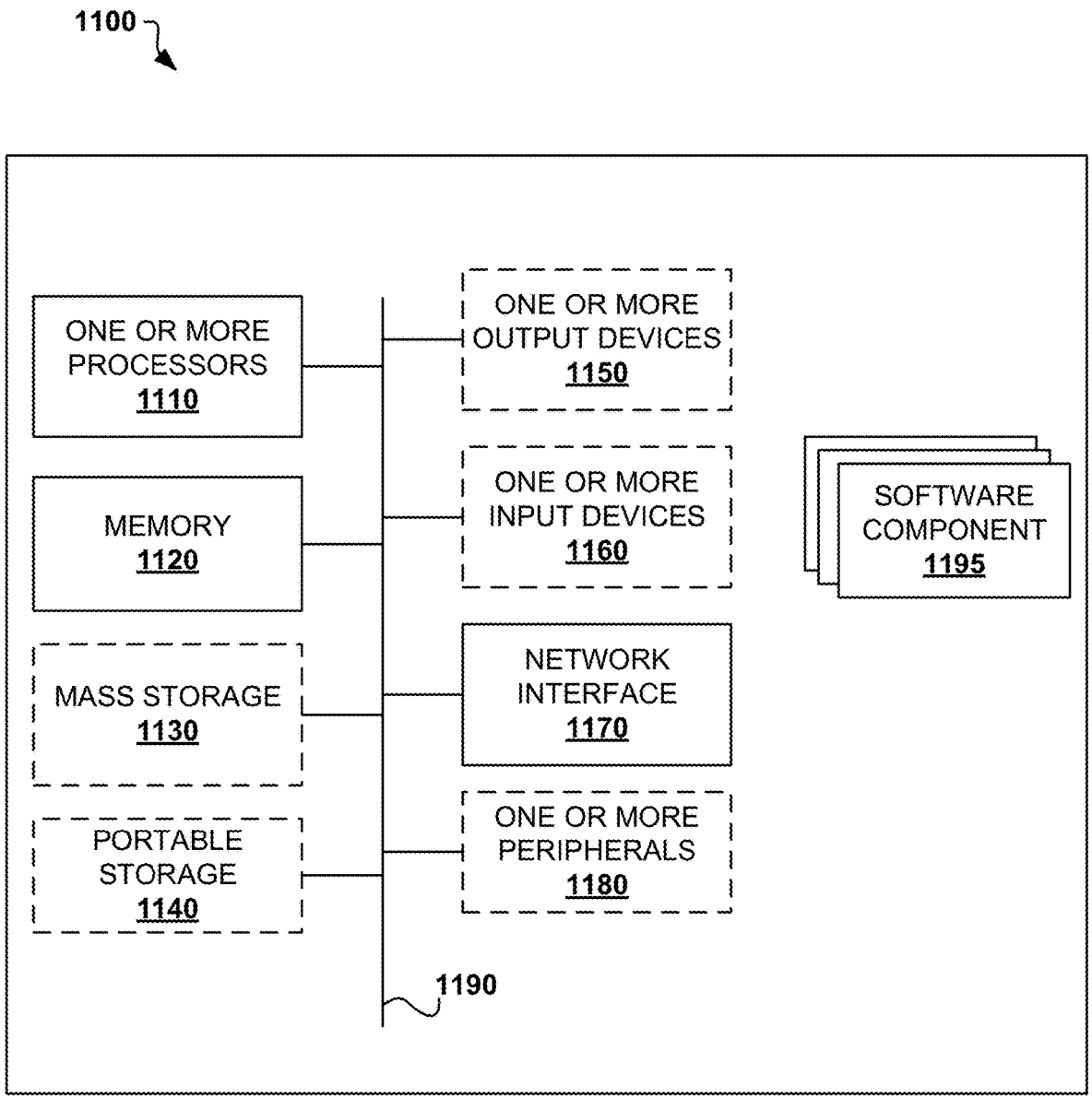
FIG. 11 shows an example computer system that can be used to implement the methods for providing personalized videos featuring multiple persons.

FIG. 11 illustrates an example computing system 1100 that may be used to implement methods described herein. The computing system 1100 may be implemented in the contexts of the likes of computing devices 105 and 110, the messenger services system 130, the messenger 220, and the system 300 for providing personalized videos featuring multiple persons.

As shown in FIG. 11, the hardware components of the computing system 1100 may include one or more processors 1110 and memory 1120. Memory 1120 stores, in part, instructions and data for execution by processor 1110. Memory 1120 can store the executable code when the computing system 1100 is in operation. The computing system 1100 may further include an optional mass storage device 1130, optional portable storage medium drive(s) 1140, one or more optional output devices 1150, one or more optional input devices 1160, an optional network interface 1170, and one or more optional peripheral devices 1180. The computing system 1100 can also include one or more software components 1195 (e.g., ones that can implement the method for providing personalized videos featuring multiple persons as described herein).

The components shown in FIG. 11 are depicted as being connected via a single bus 1190. The components may be connected through one or more data transport means or data network. The processor 1110 and memory 1120 may be connected via a local microprocessor bus, and the mass storage device 1130, peripheral device(s) 1180, portable storage medium drive(s) 1140, and network interface 1170 may be connected via one or more input/output (I/O) buses.

The mass storage device 1130, which may be implemented with a magnetic disk drive, solid-state disk drive, or an optical disk drive, is a non-volatile storage device for storing data and instructions for use by the processor 1110. Mass storage device 1130 can store the system software (e.g., software components 1195) for implementing embodiments described herein.

Portable storage medium drive(s) 1140 operates in conjunction with a portable non-volatile storage medium, such as a compact disk (CD), or digital video disc (DVD), to input and output data and code to and from the computing system 1100. The system software (e.g., software components 1195) for implementing embodiments described herein may be stored on such a portable medium and input to the computing system 1100 via the portable storage medium drive(s) 1140.

The optional input devices 1160 provide a portion of a user interface. The input devices 1160 may include an alphanumeric keypad, such as a keyboard, for inputting alphanumeric and other information, or a pointing device, such as a mouse, a trackball, a stylus, or cursor direction keys. The input devices 1160 can also include a camera or scanner. Additionally, the computing system 1100 as shown in FIG. 11 includes optional output devices 1150. Suitable output devices include speakers, printers, network interfaces, and monitors.

The network interface 1170 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1170 may be a network interface card, such as an Ethernet card, optical transceiver, radio frequency transceiver, or any other type of device that can send and receive information. The optional peripheral devices 1180 may include any type of computer support device to add additional functionality to the computer system.

The components contained in the computing system 1100 are intended to represent a broad category of computer components. Thus, the computing system 1100 can be a server, personal computer, hand-held computing device, telephone, mobile computing device, workstation, minicomputer, mainframe computer, network node, or any other computing device. The computing system 1100 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for providing personalized videos featuring multiple persons have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing personalized videos featuring multiple persons, the method comprising:
    enabling, by a computing device, a communication chat between a user of the computing device and at least one further user of at least one further computing device;
    receiving, by the computing device, a user selection of a video from one or more personalized videos stored in the computing device, wherein the video includes at least one frame, the at least one frame including at least a target face and at least one further target face;
    receiving, by the computing device, an image of a source face and a further image of a further source face, the further image of the further source face being selected from a list of face images of members of the communication chat, the list of face images including face images of members of the communication chat that provided permission to use the face images for generating the personalized videos, the list of face images being ordered based on a recent activity of the members of the communication chat;
    modifying, by the computing device, the image of the source face to generate an image of a modified source face, wherein the modified source face adopts a facial expression of the target face;
    modifying, by the computing device, the further image of the further source face to generate an image of a modified further source face, wherein the modified further source face adopts a facial expression of the at least one further target face;
    replacing, by the computing device, in the at least one frame of the video, the target face with the image of the modified source face and the at least one further target face with the modified further source face to generate a personalized video; and
    sending, by the computing device, the personalized video to the at least one further user via the communication chat.

2. The method of claim 1, wherein the receiving the image of the source face includes:
    receiving a user selection of a pre-generated image from a set of images stored in a memory of the computing device; and
    segmenting the pre-generated image into a portion including the source face and a background.

3. The method of claim 1, wherein the receiving the image of the source face includes:
    capturing, by a camera of the computing device, a new image; and
    segmenting the new image into a portion including the source face and a background.

4. The method of claim 1, further comprising:
receiving, by the computing device, a user permission to use the image of the source face for generating further personalized videos on the at least one further computing device; and
upon the receiving the user permission, sending, by the computing device, an indication of the user permission and the image of the source face to the at least one further computing device.

5. The method of claim 1, wherein the further image of the further source face is selected from the list of face images based on an input provided by the user.

6. The method of claim 1, further comprising, upon the receiving of the further image of the further source face, segmenting the further image into a portion including the further source face and a background.

7. The method of claim 1, further comprising, prior to the modifying the further image of the further source face, determining that the at least one further user has provided a permission to use the further image of the further source face for generating the personalized video.

8. The method of claim 1, further comprising, prior to the modifying the image of the source face, determining, based on the target face in the at least one frame, target facial expression parameters associated with a parametric face model, wherein:
the modifying the image of the source face includes:
determining, based on the image of the source face, source parameters associated with the parametric face model, the source parameters including source facial expression parameters, source facial identity parameters, and source facial texture parameters; and
synthesizing the image of the modified source face based on the parametric face model and the target facial expression parameters, the source facial identity parameters, and the source facial texture parameters.

9. The method of claim 8, wherein the at least one frame includes metadata, the metadata including the target facial expression parameters.

10. The method of claim 1, further comprising, prior to the modifying the further image of the further source face, determining, based on the further target face in the at least one frame, target facial expression parameters associated with a parametric face model, wherein:
the modifying the further image of the further source face includes:
determining, based on the further image of the further source face, source parameters associated with the parametric face model, the source parameters including source facial expression parameters, source facial identity parameters, and source facial texture parameters; and
synthesizing the further image of the modified further source face based on the parametric face model and the target facial expression parameters, the source facial identity parameters, and the source facial texture parameters.

11. A system for providing personalized videos featuring multiple persons, the system comprising at least one processor and a memory storing processor-executable codes, wherein the at least one processor is configured to implement the following operations upon executing the processor-executable codes:
enabling, by a computing device, a communication chat between a user of the computing device and at least one further user of at least one further computing device;
receiving, by the computing device, a user selection of a video from one or more personalized videos stored in the computing device, wherein the video includes at least one frame, the at least one frame including at least a target face and at least one further target face;
receiving, by the computing device, an image of a source face and a further image of a further source face, the further image of the further source face being selected from a list of face images of members of the communication chat, the list of face images including face images of members of the communication chat that provided permission to use the face images for generating the personalized videos, the list of face images being ordered based on a recent activity of the members of the communication chat;
modifying, by the computing device, the image of the source face to generate an image of a modified source face, wherein the modified source face adopts a facial expression of the target face;
modifying, by the computing device, the further image of the further source face to generate an image of a modified further source face, wherein the modified further source face adopts a facial expression of the at least one further target face;
replacing, by the computing device, in the at least one frame of the video, the target face with the image of the modified source face and the at least one further target face with the modified further source face to generate a personalized video; and
sending, by the computing device, the personalized video to the at least one further user via the communication chat.

12. The system of claim 11, wherein the receiving the image of the source face includes:
receiving a user selection of a pre-generated image from a set of images stored in a memory of the computing device; and
segmenting the pre-generated image into a portion including the source face and a background.

13. The system of claim 11, wherein the receiving the image of the source face includes:
capturing, by a camera of the computing device, a new image; and
segmenting the new image into a portion including the source face and a background.

14. The system of claim 11, wherein the at least one processor is further configured to:
receive, by the computing device, a user permission to use the image of the source face for generating further personalized videos on the at least one further computing device; and
upon the receiving the user permission, send, by the computing device, an indication of the user permission and the image of the source face to the at least one further computing device.

15. The system of claim 11, wherein the further image of the further source face is selected from the list of face images based on an input provided by the user.

16. The system of claim 11, wherein the at least one processor is further configured to, upon the receiving of the further image of the further source face, segment the further image into a portion including the further source face and a background.

17. The system of claim 11, wherein the at least one processor is further configured to, prior to the modifying the further image of the further source face, determine that the at least one further user has provided a permission to use the further image of the further source face for generating the personalized video.

18. The system of claim 11, wherein the at least one processor is further configured to, prior to the modifying the image of the source face, determine, based on the target face in the at least one frame, target facial expression parameters associated with a parametric face model, wherein:
the modifying the image of the source face includes:
determining, based on the image of the source face, source parameters associated with the parametric face model, the source parameters including source facial expression parameters, source facial identity parameters, and source facial texture parameters; and
synthesizing the image of the modified source face based on the parametric face model and the target facial expression parameters, the source facial identity parameters, and the source facial texture parameters.

19. The system of claim 18, wherein the at least one frame includes metadata, the metadata including the target facial expression parameters.

20. A non-transitory processor-readable medium having instructions stored thereon, which, when executed by one or more processors, cause the one or more processors to implement a method for providing personalized videos featuring multiple persons, the method comprising:
enabling, by a computing device, a communication chat between a user of the computing device and at least one further user of at least one further computing device;
receiving, by the computing device, a user selection of a video from one or more personalized videos stored in the computing device, wherein the video includes at least one frame, the at least one frame including at least a target face and at least one further target face;
receiving, by the computing device, an image of a source face and a further image of a further source face, the further image of the further source face being selected from a list of face images of members of the communication chat, the list of face images including face images of members of the communication chat that provided permission to use the face images for generating the personalized videos, the list of face images being ordered based on a recent activity of the members of the communication chat;
modifying, by the computing device, the image of the source face to generate an image of a modified source face, wherein the modified source face adopts a facial expression of the target face;
modifying, by the computing device, the further image of the further source face to generate an image of a modified further source face, wherein the modified further source face adopts a facial expression of the at least one further target face;
replacing, by the computing device, in the at least one frame of the video, the target face with the image of the modified source face and the at least one further target face with the modified further source face to generate a personalized video; and
sending, by the computing device, the personalized video to the at least one further user via the communication chat.

* * * * *